(12) United States Patent
Cziomer et al.

(10) Patent No.: US 9,919,624 B2
(45) Date of Patent: Mar. 20, 2018

(54) TRACK ASSEMBLY

(71) Applicant: Lear Corporation, Southfield, MI (US)

(72) Inventors: Alfred Cziomer, Rietberg (DE); Marc Laumeier, Langenberg-Benteler (DE); Klaus Walter, Panderborn (DE); Michael Wojatzki, Ennigerloh (DE); Torsten Bochert, Rietberg (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/379,391

(22) Filed: Dec. 14, 2016

(65) Prior Publication Data

US 2017/0166091 A1 Jun. 15, 2017

Related U.S. Application Data

(60) Provisional application No. 62/267,615, filed on Dec. 15, 2015.

(30) Foreign Application Priority Data

Dec. 9, 2016 (DE) .................. 10 2016 224 588

(51) Int. Cl.
*B60N 2/07* (2006.01)

(52) U.S. Cl.
CPC .............. *B60N 2/07* (2013.01); *B60N 2/0715* (2013.01)

(58) Field of Classification Search
CPC .. B60N 2/0715; B60N 2/0705; B60N 2/0818; B60N 2/0825; B60N 2/067; B60N 2/0232; B60N 2/0843; B60N 2/0875; B60N 2/123; B60N 2/06; B60N 2/085; B60N 2/0732; B60N 2/0887; B60N 2/072; B60N 2/071
USPC .......................................... 248/424, 429, 430
See application file for complete search history.

(56) References Cited

U.S. PATENT DOCUMENTS

| 4,530,481 | A | * | 7/1985 | Kluting ................ | B60N 2/0705 248/394 |
| 4,613,186 | A | * | 9/1986 | LaPointe ................ | A47C 1/034 297/259.2 |
| 5,106,144 | A | * | 4/1992 | Hayakawa ............. | B60N 2/071 248/429 |
| 5,158,338 | A | * | 10/1992 | Hayakawa ......... | B60N 2/01591 297/335 |
| 5,348,261 | A | * | 9/1994 | Nini ..................... | B60N 2/0715 248/424 |
| 5,368,355 | A | * | 11/1994 | Hayden .............. | B60N 2/01591 248/429 |

(Continued)

*Primary Examiner* — Steven M Marsh
(74) *Attorney, Agent, or Firm* — Fishman Stewart PLLC

(57) ABSTRACT

A track assembly includes an upper track that includes an interface member having a first end and a second end, a plurality of wheel assemblies, an anchor, and one or more locking blocks disposed on a side of the interface member. Embodiments of the system include a lower track with a first side and a second side, wherein a flat portion is disposed near a top of each of the first side and the second side. In embodiments, flat portions may extend along a longitudinal axis associated with the lower track. A plurality of gaps may be disposed on the flat portions, and the gaps may be configured to receive a locking block and an anchor. The anchor may be configured to guide the upper track as the upper track travels along the longitudinal axis associated with the lower track.

20 Claims, 13 Drawing Sheets

(56) References Cited

U.S. PATENT DOCUMENTS

2014/0110554 A1* 4/2014 Oya .................... B60N 2/0705
                                                      248/430
2015/0129737 A1* 5/2015 Oya .................... B60N 2/0722
                                                      248/429
2016/0114703 A1* 4/2016 Fujita .................. B60N 2/0232
                                                      297/344.1

* cited by examiner

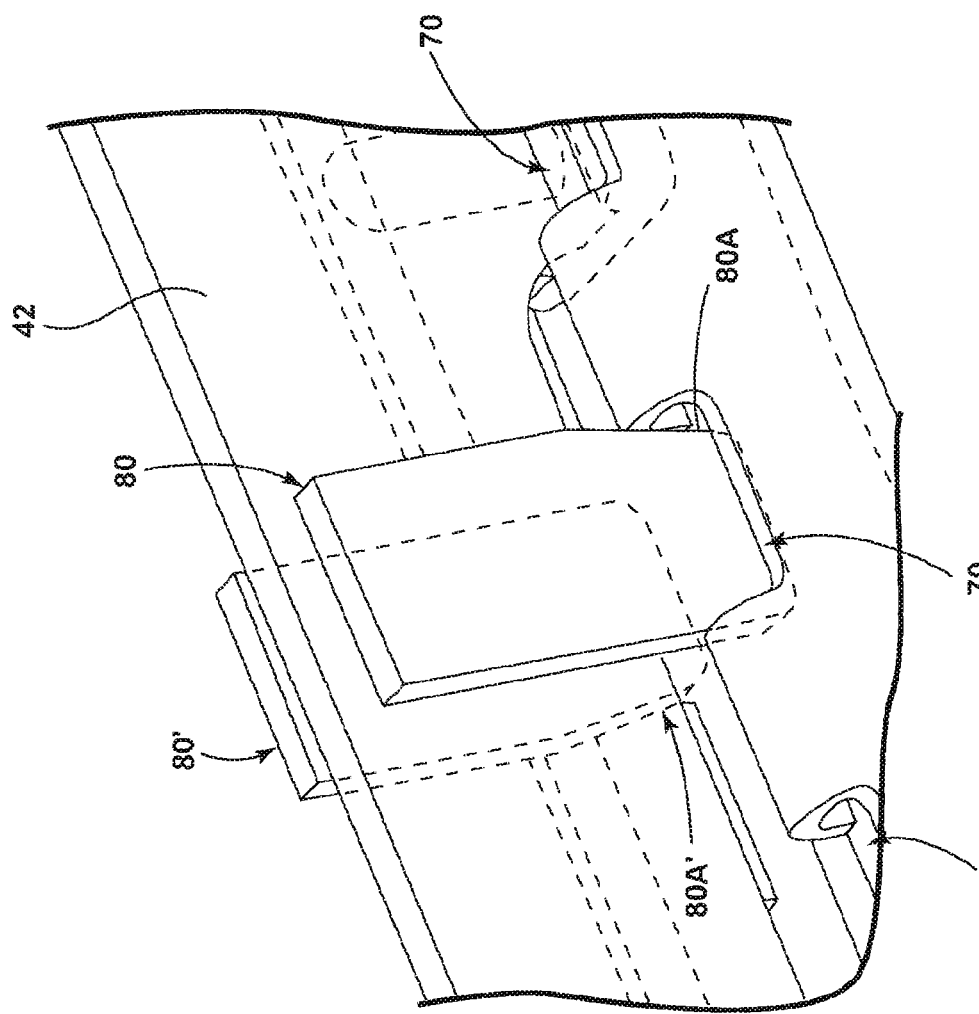

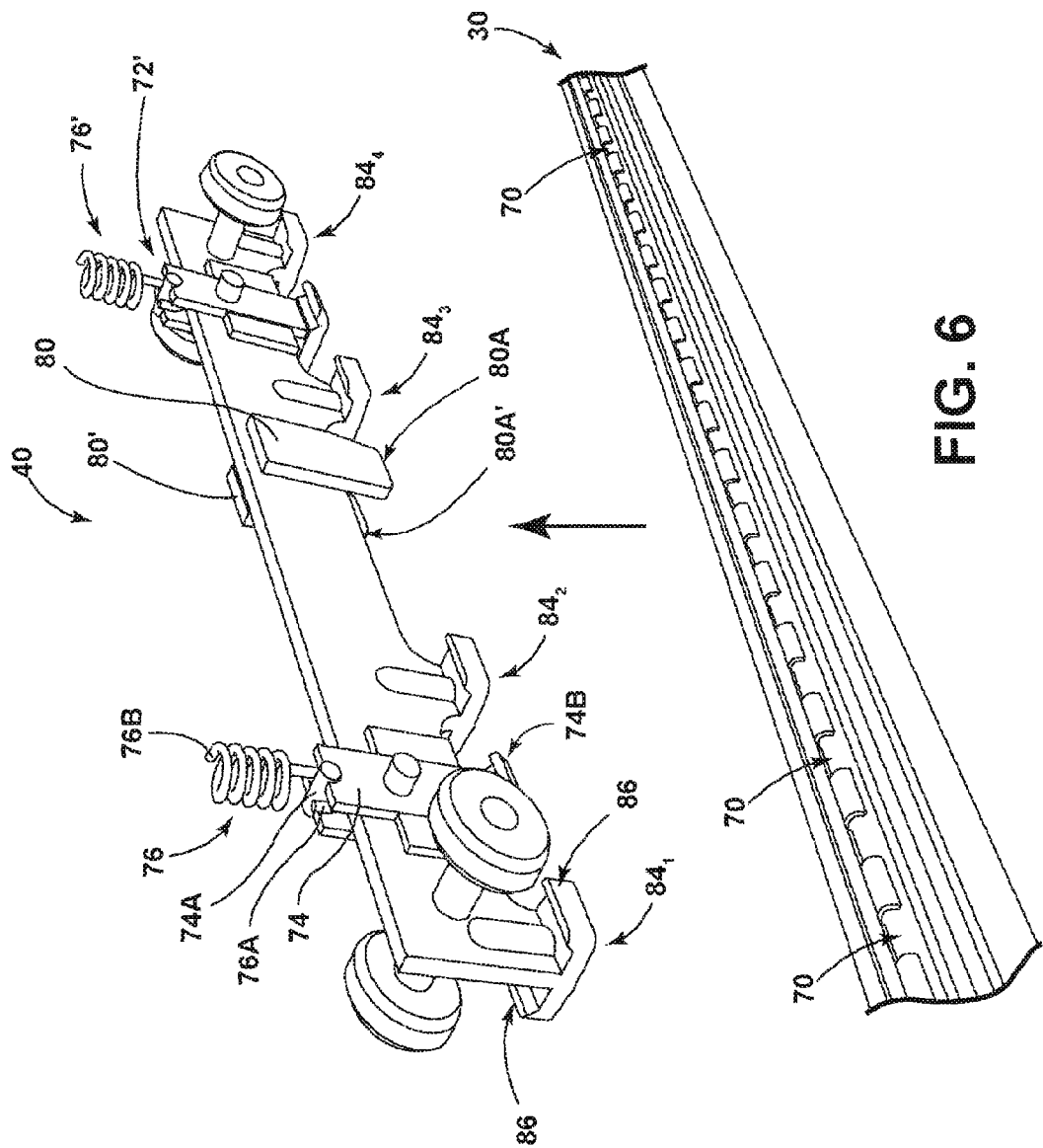

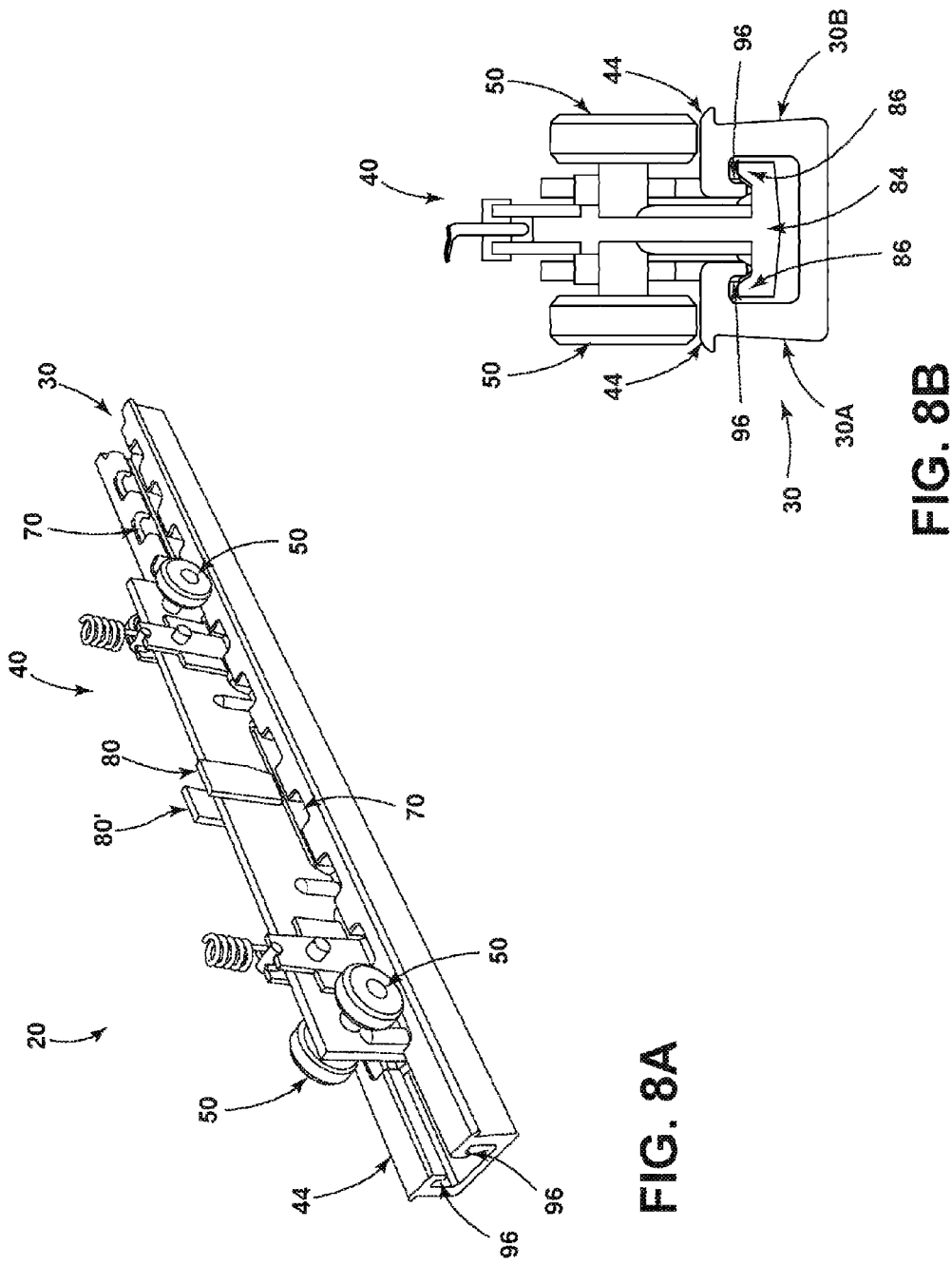

TRACK ASSEMBLY

CROSS-REFERENCE TO RELATED APPLICATIONS

This application claims the benefit of U.S. Provisional Patent Application Ser. No. 62/267,615 filed on Dec. 15, 2015 and German Patent Application No. 102016224588.0 filed Dec. 9, 2016, the disclosures of which are hereby incorporated herein by reference in their entirety.

TECHNICAL FIELD

The present disclosure relates to seat assemblies, including one or more seats configured to be assembled with and/or disassembled from a plurality of seat track assemblies.

BACKGROUND

Passenger vehicles, such as automobiles for example, may include one or more seat assemblies that may be configured to support occupants within the vehicle. A seat assembly may include a seat bottom and a seat back, which can be supported on the seat bottom. In turn, the seat bottom may be secured to or otherwise supported on a floor located within a passenger compartment of the vehicle. For example, the seat assembly may be supported by one or more seat track assemblies for movement in the fore and aft directions (e.g., forward and backward) along the floor of the vehicle.

The seat assemblies may be configured to be selectively assembled with and/or disassembled from the passenger vehicle. By way of non-limiting example, one or more seat assemblies may be disassembled from a seat track and removed from the vehicle. Typically, one or more seat assemblies may be slid and/or moved into a predetermined position along the lower track. For example, and without limitation, one or more seat assemblies may be slid toward a front of the passenger compartment until the one or more seat assembly is prevented from traveling further along the lower track. The one or more seat assemblies may then be disassembled from the lower track. Conversely, the one or more seat assemblies may be assembled with the lower track in order to, for example, and without limitation, place the one or more seat assemblies back into the vehicle.

Additionally, the one or more seat assemblies may include a predefined travel distance relative to the lower track. For example, and without limitation, the one or more seat assemblies may be configured to travel along the lower seat rail between a forward most position and a rearward most position. The one or more seat assemblies may be slid along the lower tracks in order to, for example, and without limitation, selectively adjust an amount of space between various seat rows within the vehicle. However, because the one or more seat assemblies may be configured to travel within the predefined distance along the lower track, the amount of space between the various seat rows may be limited to the travel distance of the seat assemblies. Accordingly, a system configured to allow the seat assemblies to travel further along the lower track and/or to allow the seat assemblies to be assembled with and/or disassembled from the lower track in various positions may be desirable.

SUMMARY

In embodiments, a seat track assembly system may comprise an upper track and a lower track. The upper track may be configured to support a portion of a vehicle seat. The upper track may include at least one interface member comprising a first end and a second end, a plurality of wheel assemblies disposed near each of the first end and the second end of the at least one interface member, an anchor disposed on a lower portion of the upper track, and one or more locking blocks disposed on a side of the at least one interface member. The lower track may be configured to support a portion of the upper track and to engage a portion of a floor associated with a vehicle. The lower track may include a first side and a second side, wherein a flat portion is disposed near a top of each of the first side and the second side. The flat portions may extend along a longitudinal axis associated with the lower track. The lower track may also include a plurality of gaps disposed on each of the flat portions, wherein the gaps are configured to receive the one or more locking blocks and the anchor. The anchor may be configured to guide the upper track as the upper track travels along the longitudinal axis associated with the lower track.

In embodiments, a track assembly may comprise a first track and/or a second track. The second track may be movably connected to the first track. The second track may comprise an interface member, a plurality of wheels that may be connected to the seat interface member, an anchor that may be movably connected to the interface member and may be configured to selectively engage the first track, and a locking block that may be movably connected to the interface member and may be configured to selectively engage the first track. The anchor may be configured to restrict movement of the second track relative to the first track in a first direction. The locking block may be configured to restrict movement of the second track relative to the first track in a second direction. The first direction may include a vertical direction and the second direction may include a longitudinal direction. A spring may be connected to the anchor and may be configured to bias the anchor into engagement with the first track. The plurality of wheels may include four wheels configured to roll in a longitudinal direction on a rolling surface of the first track. The first track may include a plurality of gaps and the locking block may be configured to engage one or more of the plurality of gaps. The track assembly may include a second anchor. The second anchor may be movably connected to the interface member and may be configured to selectively engage the first track. The track assembly may include a second locking block. The locking block and the second locking block may be disposed at opposite sides of the interface member. The locking block may include a chamfered leading edge/side and the second locking block may include a chamfered trailing edge/side. The locking block and the second locking block may be configured to move independently from each other. The first track may include an inner profile and an outer profile. The inner profile may comprise steel and the outer profile may comprise aluminum. The track assembly may include a release alignment mechanism that may be connected to the second track. The release alignment mechanism may include a first lever and a second lever. The second lever may be configured to selectively engage the first track upon actuation of the first lever.

BRIEF DESCRIPTION OF THE DRAWINGS

FIG. 5 is a perspective view generally illustrating a blocking element of a track assembly according to another embodiment of the present disclosure;

FIG. 6 is a perspective view generally illustrating a track assembly according to another embodiment of the present disclosure;

FIG. 8A is a perspective view generally illustrating a track assembly according to another embodiment of the present disclosure;

FIG. 8B is a front view generally illustrating the track assembly generally illustrated in FIG. 8A;

DETAILED DESCRIPTION

Reference will now be made in detail to embodiments of the present disclosure, examples of which are described herein and illustrated in the accompanying drawings. While the present disclosure will be described in conjunction with embodiments, it should be understood that they are not intended to limit the present disclosure to these embodiments. On the contrary, the present disclosure is intended to cover alternatives, modifications and equivalents, which may be included within the spirit and scope of the invention as defined by the appended claims. Relative terms such as "lower," "upper," "upwardly," "downwardly," "vertical," "horizontal," and "lateral" are used throughout this disclosure to provide convenient reference and are not intended to limit the scope or orientation of the components which they describe.

Figure 1:
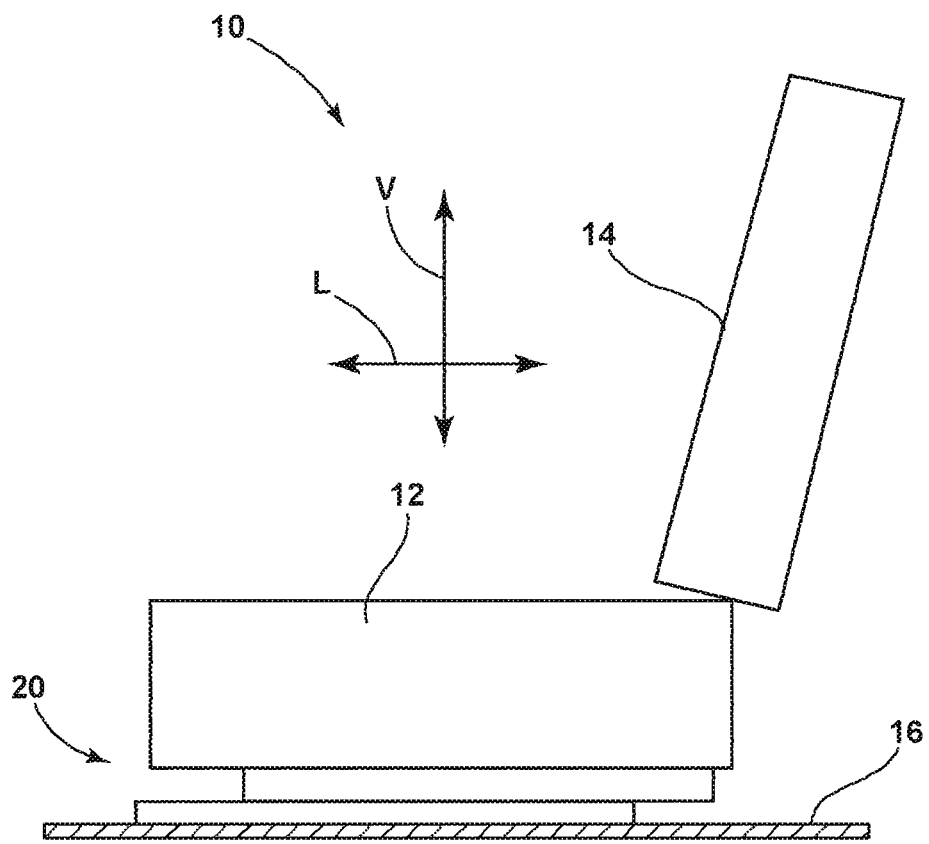
FIG. 1 is a side view of a vehicle seat assembly supported on at least one seat track assembly according to an embodiment of the present disclosure.

Referring now to FIG. 1, a seat assembly according to an embodiment of the present disclosure is generally illustrated at 10. In an embodiment, the seat assembly 10 may be configured to support an occupant in a vehicle, such as in an automobile or other type of passenger vehicle. The seat assembly 10 may include a seat bottom 12 and a seat back 14, which can be supported on the seat bottom 12. In turn, the seat bottom 12 can be secured to or otherwise supported on a mounting surface 16 (e.g., a floor within a passenger compartment of the vehicle).

In an embodiment, the seat assembly 10 may be supported on at least one seat track assembly 20. For example and without limitation, the seat assembly 10 may be supported on a pair of seat track assemblies 20 that may be spaced apart from one another (e.g., in transverse direction T). As will be generally disclosed below, the seat track assemblies 20 may be configured to support the seat assembly 10 on the floor 16 of the vehicle for longitudinal movement in the fore and aft directions L (e.g., forward and backward). A seat track locking mechanism may be optionally provided on the seat track assembly 20 to lock the seat assembly 10 in a selected position. It should be appreciated that the seat track assembly 20 is not limited to use with the illustrated seat assembly 10 or in passenger vehicles in general, but can be used in other suitable environments and for other suitable purposes.

Figure 2:
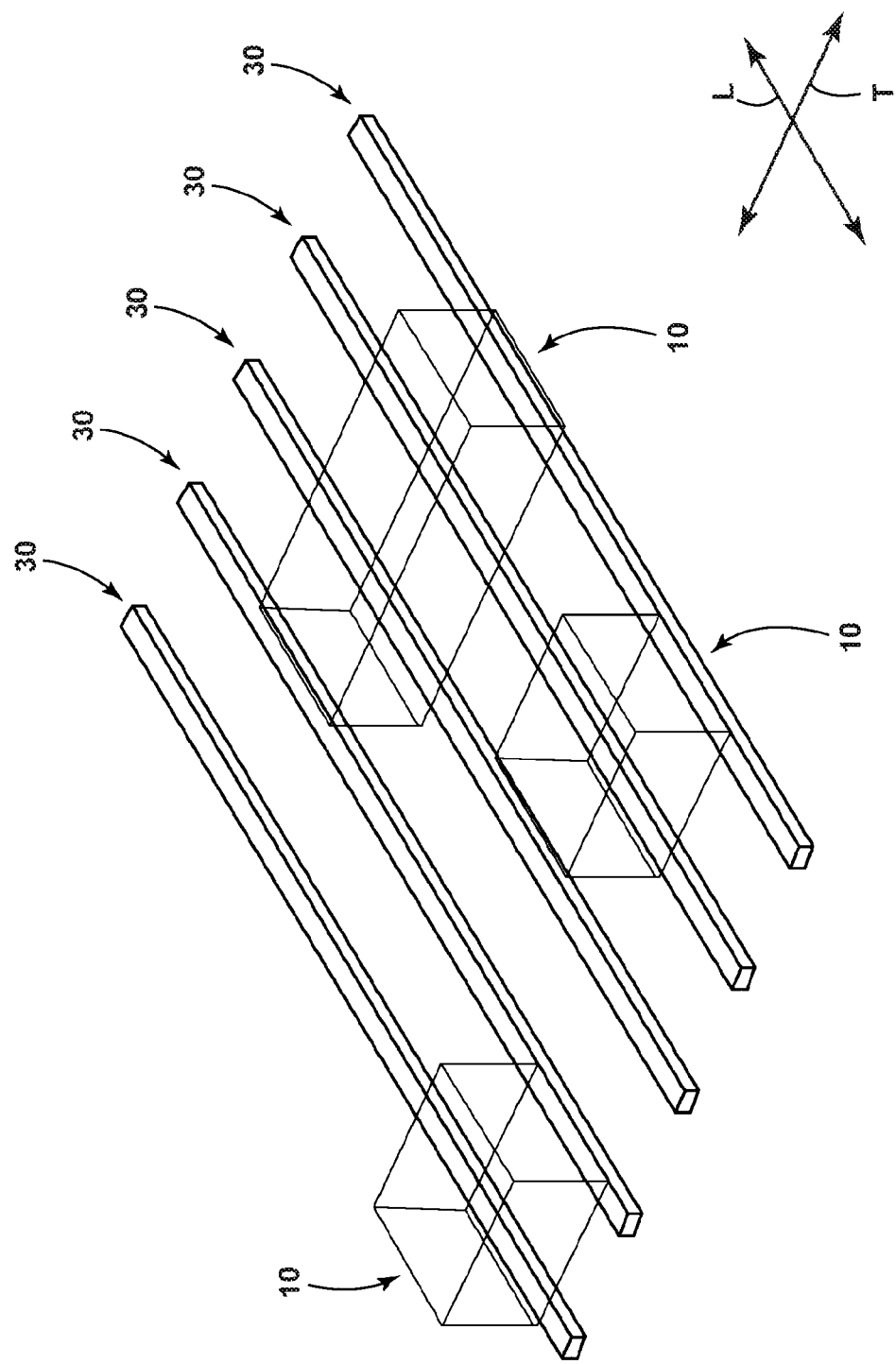
FIG. 2 is a block diagram generally illustrating various track assemblies according to embodiments of the present disclosure.

FIG. 2 generally illustrates a plurality of seat assemblies 10 disposed along a plurality of first/lower tracks 30. As will be described in detail, each seat assembly 10 may be configured to traverse some, all, or substantially all of a length of a corresponding lower track 30. In embodiments, each of the seat assemblies 10 may be configured to be selectively removed from and/or replaced within the vehicle. For example, and without limitation, a seat assembly 10 may be disposed at or near front, middle, and/or rear portions of the vehicle. The seat assembly 10 may interact with a corresponding lower track 30.

In embodiments, the seat assembly 10 may include an actuator, such as, for example, a lever. The lever may be configured to disengage a portion of the seat assembly 10 from the corresponding lower track 30 when the lever is actuated. The seat assembly 10 may be configured to be removed from the vehicle when the lever is actuated and the seat assembly 10 is disengaged from the lower track 30. Conversely, the seat assembly 10 may be configured to engage the corresponding lower track 30 when the seat assembly 10 is replaced within the vehicle. In embodiments, the seat assembly 10 may be configured to be removed from and/or replaced within the vehicle at substantially any position along the length of the corresponding lower track 30.

Figure 3:
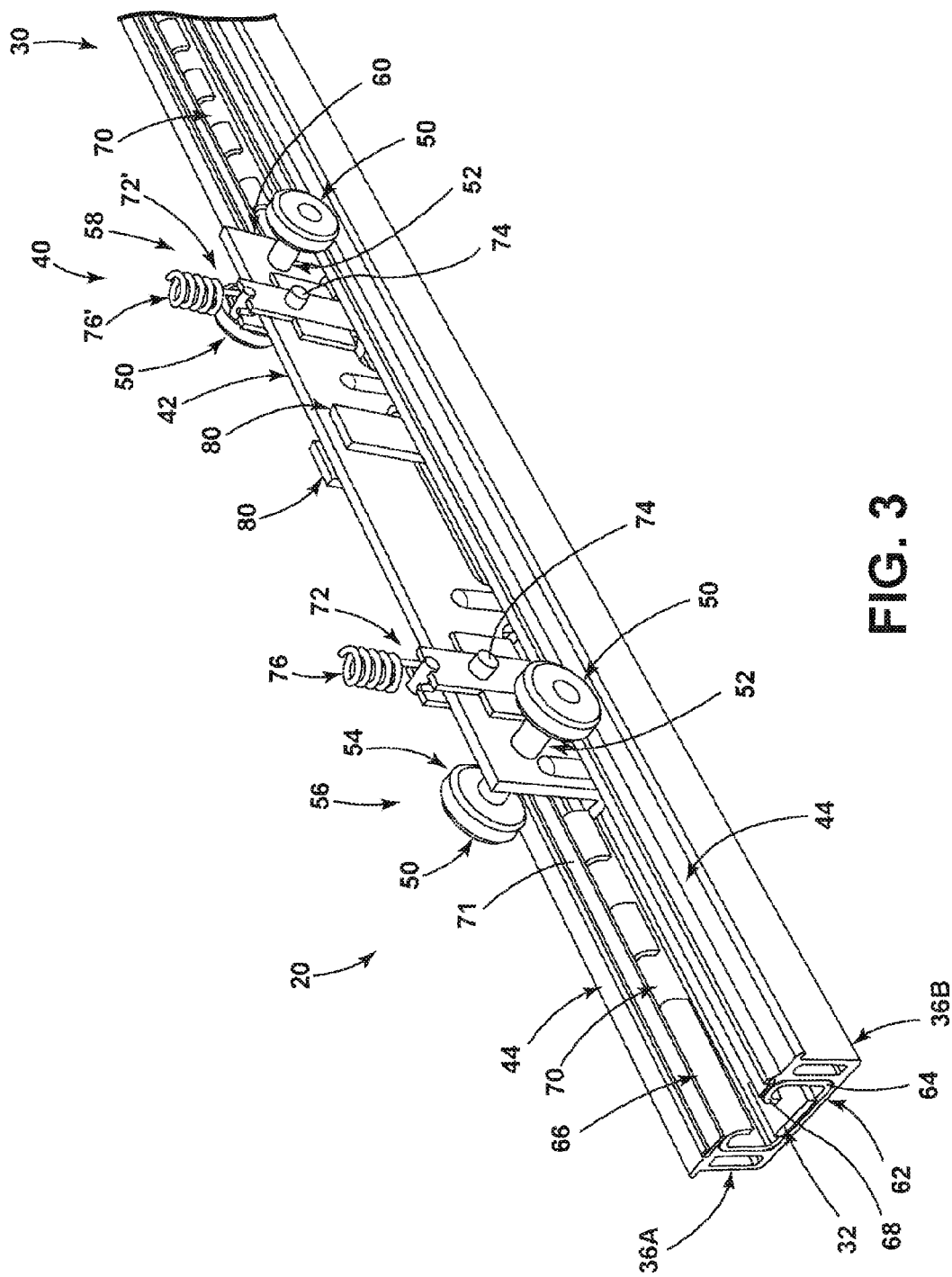
FIG. 3 is a perspective view generally illustrating a track assembly according to an embodiment of the present disclosure.

With reference to FIG. 3, a track assembly 20 according to an embodiment of the present disclosure is generally illustrated. The track assembly 20 may include a first or lower track 30 and a second or upper track 40. The lower track 30 may be secured to and/or otherwise supported on a surface/floor 16 (see, e.g., FIG. 1), for example within a passenger compartment of a vehicle using one or more floor fasteners 32. The floor fasteners 32 may, for example, and without limitation, comprise rivets, screws, bolts and/or other suitable connections and/or fasteners. In embodiments, track assembly 20 may be used in connection with a seat, such as a vehicle seat, and may be referred to a seat track assembly 20, but track assembly 20 is not limited to seating applications.

In embodiments, the upper track 40 may be supported for sliding movement on the lower track 30. For example, and without limitation, a plurality of wheels 50 (e.g., cylindrical rollers, bearings, and/or other formations configured for facilitating movement for the upper track along the lower track) may be disposed in various positions along the upper track 40. In embodiments, such as generally illustrated in FIG. 3, the upper track 40 may include a first wheel assembly 54 that may be disposed near a first end 56 of upper track 40. Upper track 40 may include a second wheel assembly 58 disposed near a second end 60 of upper track 40. Each of the first wheel assembly 54 and the second wheel assembly 58 may include a wheel axle 52. For example, and without limitation, a wheel of plurality of wheels 50 may be disposed at opposite ends of each wheel axle 52. It is understood that while only two wheel assemblies are illustrated, the present disclosure contemplates embodiments with one, two, or more wheel assemblies.

Figure 4:
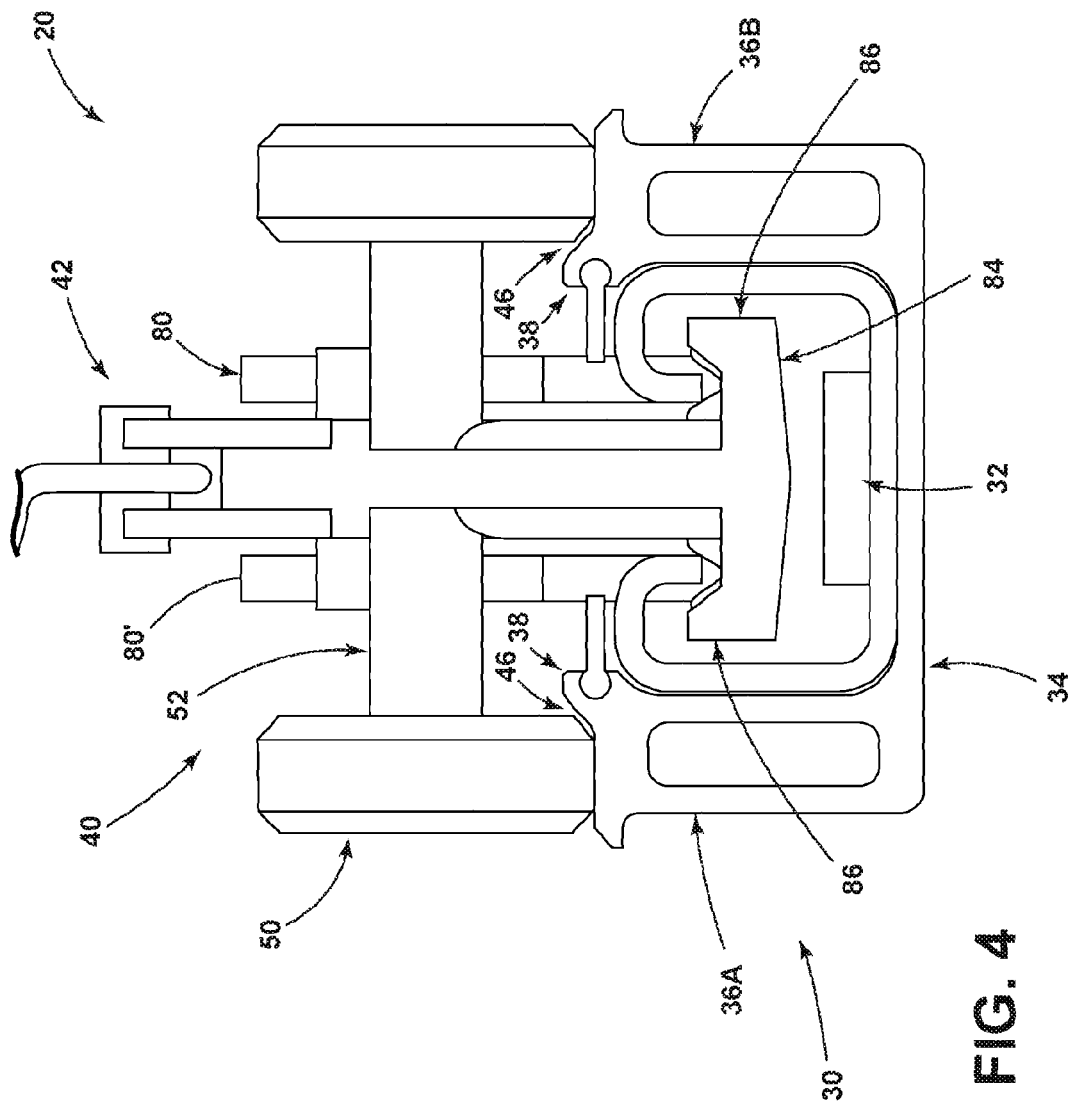
FIG. 4 is a front view generally illustrating a track assembly according to another embodiment of the present disclosure.

In embodiments, a seat assembly 10 may be secured to or otherwise supported on an upper track 40. It should be appreciated that a seat track assembly 20 may include additional components and/or additional structural features without departing from the scope of the present disclosure. In embodiments, a lower track 30 may include an elongated track member and may, for example, define a generally U-shaped track when viewed from an end thereof, such as generally shown in FIG. 4. For example, and without limitation, a lower track 30 may include a base portion 34 and/or a pair of opposing outer rails 36A and 36B that may extend in a generally upward direction from opposite edges of the lower base portion 34 respectively. Additionally or alternatively, in embodiments, a lower track 30 may include other suitable shapes and may include additional components and/or additional structural features without departing from the scope of the present disclosure.

In embodiments, a lower track 30 may comprise an outer profile 62. The outer profile 62 may comprise aluminum and/or other suitable materials. In embodiments, a lower track 30 may include an inner profile 64. Inner profile 64 may, for example, include a generally U-shaped configuration, and may extend along and/or generally parallel with a longitudinal axis associated with a lower track 30. In embodiments, the inner profile 64 may include a first side 66 and/or a second side 68. The first side 66 may be disposed opposite the second side 68. Inner profile 64 may include steel and/or other suitable materials, such as plastic. Inner profile 64 may include a plurality of gaps 70. The gaps 70 may be disposed at various, uniform or non-uniform, positions along each of a first side 66 and a second side 68. In embodiments, the gaps 70 may be substantially evenly distributed along each of the first side 66 and/or the second side 68. The gaps 70 may be configured to allow upper track 40 to be disassembled (e.g., removed from) a corresponding lower track 30. The gaps 70 may include one or more recesses or holes in each of the first side 66 and/or the second side 68. In embodiments, the recess or holes may be, for example, about 20 millimeters; although, other suitable sizes may be employed.

In embodiments, a track assembly 20 may include a cover 71 (e.g., a rubber cover, a brush cover, etc.) that may be connected to the outer profile 62 and may be disposed such that it covers at least a portion of the inner profile 64. For example, and without limitation, the cover 71 may comprise a strip of rubber connected to the outer profile 62 and disposed on an upper portion of each side of the inner profile 64. The cover 71 may extend along and/or generally parallel with a longitudinal axis associated with the inner profile 64. In embodiments, the cover 71 may cover at least a portion of corresponding gaps 70. The cover 71 may be configured to limit/prevent dirt and/or debris from entering or falling into corresponding gaps 70. Additional or alternatively, rubber cover 71 may support assembly and/or disassembly of an upper track 40 with a lower track 30.

In embodiments, an upper track 40 may be configured to engage a corresponding lower track 30. With continued reference to FIG. 3, the upper track 40 may include an interface member 42, which may be configured, for example, as an interface member, but is not limited to seating applications or a plate configuration. The interface member 42 may be configured to support or receive at least a portion of a seat assembly 10. In embodiments, the interface member 42 may include an elongated plate that may extend between a first end 56 and a second end 60 of the upper track 40. The interface member 42 may be configured to support one or more wheel axles 52. For example, and without limitation, an interface member 42 may be configured to support two wheel axles 52. Each of the wheel axles 52 may be at least partially received within a through bore that may be disposed at or about the first end 56 and/or the second end 60 of an interface member 42. In embodiments, a plurality of wheels 50 may be disposed on or about corresponding ends of some or all of the wheel axles 52.

In embodiments, a plurality of wheels 50 may be configured to engage and/or make contact with an upper portion 44 of a corresponding lower track 30. As generally illustrated in FIG. 3, the upper portion 44 may, for example, include a bearing portion, which may be substantially flat and/or may be disposed along each of an outer rail 36A and an outer rail 36B. Wheels 50 may be configured to roll along corresponding upper portion 44. In embodiments, upper portion 44 may include a corresponding protrusion 38, such as generally illustrated in FIG. 4. Protrusion 38 may extend along a length of upper portion 44. One or more of the wheels 50 may include a chamfer 46. Chamfer 46 may be configured to cooperate with a corresponding protrusion 38 to support corresponding wheel 50. For example, and without limitation, upper track 40 may be configured to move freely in the longitudinal direction L. In embodiments, one or more of the wheels 50 may include a flange 50A (see, e.g., FIG. 12A) that may be disposed at its inner edge and/or may be configured to engage and/or to be retained by upper portion 44.

In embodiments, a transverse direction/axis T may be disposed perpendicular to a longitudinal axis associated with a corresponding lower track 30. Chamfer 46 may cooperate with a corresponding protrusion 38 to restrict movement of upper track 40 in the transverse direction. For example, and without limitation, as the wheels 50 roll along a corresponding upper portion 44, chamfer 46 may make contact with a corresponding protrusion 38. The contact between chamfer 46 and corresponding protrusion 38 may prevent upper track 40 from traveling beyond a desired distance in the transverse direction. Additionally or alternatively, flanges 50A may contact inner edges of the upper portion 44, which may restrict transverse movement of the upper track 40 relative to the lower track 30.

In embodiments, upper track 40 may include one or more anchors 72, which may include spring-biased linear acting anchors. In embodiments, one or more anchors 72 may be configured to be biased in a vertical direction V, which may control movement of at least a portion of seat track assembly 20 in an up and/or down direction. In embodiments, one or more anchors 72 may be configured to provide tolerance compensation to at least a portion of seat track assembly 20. With continued reference to FIG. 3, the anchors 72 may include a track attachment portion 74A and/or a plurality of springs 76. The track attachment portion 74A may include a plate extending in a generally perpendicular direction relative to a corresponding interface member 42 (e.g., generally in a plane defined by the longitudinal direction L and the transverse direction T). The track attachment portion 74A may be configured to be attached and/or connected to an interface member 42. In embodiments, the track attachment portion 74A may be configured to be friction fit, snap-fit, and/or fastened via a fastener to the interface member 42. For example, and without limitation, track attachment portion 74A may be screwed, bolted, and/or fastened to interface member 42 in another suitable fashion.

In embodiments, a track attachment portion 74A may be configured to support or otherwise provide one or more corresponding springs 76. In embodiments, a first end 76A of a spring 76 may be attached and/or fastened to an upper portion of a track attachment portion 74A. A second end 76B of the spring 76 may be attached and/or connected to a bracket that may be configured, for example, to support and/or receive a portion of a seat assembly 10.

With embodiments, an anchor 72 may include an engagement portion 74B. The engagement portion 74B may be configured to engage and/or make contact with a portion of the lower track 30. For example, and without limitation, the engagement portion 74B may extend vertically upward, and a portion of the lower track 30 may extend downward toward the floor 16. The engagement portion 74B may, for example, form a generally hook-shaped protrusion configured to receive at least a portion of the downward extending portion of the lower track 30. The engagement portion 74B and the downward extending portion of the lower track 30 may cooperate to limit movement of the upper track 40 in the vertical direction V.

In embodiments, the vertical direction V may be generally perpendicular relative to a mounting surface 16, such as a vehicle floor, and/or perpendicular to the longitudinal direction L and/or the transverse direction T. In embodiments, in one or more positions of upper track 40 relative to a corresponding lower track 30, anchors 72 may be configured to engage lower track 30 to restrict vertical movement of the upper track 40 in a least some position of upper track 40 relative to lower track 30. For example, and without limitation, in positions in which anchors 72 are not aligned with gaps 70, anchors may contact/engage lower track 30 and restrict vertical movement of upper track 40 relative to lower track 30 (e.g., prevent removal of upper track 40 from lower track 30). Corresponding springs 76 may be configured to bias anchors 72 toward engagement with lower track 30 (e.g., bias anchors 72 vertically upward). Spring 76 may compensate for play between anchors 72 and lower track 30 or play between guiding portions 86 and lower track 30, and/or may reduce noise that may result from contact between lower track 30 and upper track 40 (e.g., rattles).

In embodiments, an upper track 40 may include one or more locking blocks 80, 80' such as generally illustrated in FIGS. 3 and 5. The locking blocks 80 may be configured to selectively restrict movement of the upper track 40, such as in the longitudinal direction. For example, and without limitation, a locking block 80, 80' may be disposed at one or both sides of an interface member 42. It should be understood that while only two locking blocks 80, 80' are illustrated, the present disclosure contemplates embodiments with zero, one, two, or more locking blocks.

In embodiments, the locking blocks 80, 80' may be attached, fastened, and/or connected to an interface member 42. For example, and without limitation, a locking block 80, 80' may be welded, soldered, screwed, and/or bolted in one or more of a variety of suitable fashions. The locking blocks 80, 80' may be configured to be at least partially received by a corresponding gap 70 if an upper track 40 is engaged with a corresponding lower track 30. The seat assembly 10 may be configured to be selectively adjustable along the lower track 30, such that upper track 40 may be lockable, via locking blocks 80, 80', at a plurality of positions along lower track 30. For example, and without limitation, the seat assembly 10 may be selectively moved from a first position on a lower track 30 to a second position on the lower track 30.

In embodiments, an actuator assembly 100 may be associated with an upper track 40 and may be actuated to a first actuator position and/or a second actuator position. The locking blocks 80, 80' may be configured to be raised (e.g., vertically) relative to the floor 16 when the actuator assembly 100 is in the actuated position. When the locking blocks 80, 80' are raised, the locking blocks 80, 80' may be removed from corresponding gaps 70. In embodiments, the actuator assembly 100 may be actuated to a second actuator position. The locking blocks 80, 80' may be inserted into and/or received by corresponding gaps 70 in response to the actuator assembly 100 being in the second actuator position (e.g., the locking blocks 80, 80' may be lowered into corresponding gaps 70 when the actuator assembly 100 is released and/or pushed back to an initial and/or locking position).

In embodiments, an upper track 40 may include an actuator and/or lever that may be configured to allow upper track 40 to travel along a corresponding lower track 30 when the actuator is actuated. For example, and without limitation, the actuator may be actuated to a first actuator position when the seat assembly 10 is moved from the first position to the second position. Conversely, the actuator may be actuated to a second actuator position when the seat assembly 10 is at rest and/or stationary relative to the lower track 30. In embodiments, when the actuator is in the first actuator position, an upper track 40 may be slightly raised relative to a lower track 30. Locking blocks 80, 80' may be removed from a first gap 70 when the upper track 40 is raised (e.g., vertically) relative to the lower track 30. When the actuator assembly 100 is actuated to the second actuator position, the upper track 40 may be lowered into and/or engaged with a lower track 30 (e.g., reassembled with lower track 30). In embodiments, upper track 40 may be reassembled with lower track 30 in either position of actuator assembly 100.

In embodiments, upper track 40 may be reassembled with lower track 30 such that locking blocks 80, 80' may be received by a different gap 70 than from which locking blocks 80, 80' were removed. One or more of the locking blocks 80, 80' may include a chamfered portion 80A, 80A'. Each chamfered portion 80A, 80A'may be configured to facilitate insertion and/or removal of a corresponding locking block 80, 80' relative to corresponding gaps 70. For example, and without limitation, locking block 80 may include a chamfered portion 80A that may be disposed at a rear/trailing side of locking block 80 (e.g., relative to the longitudinal direction L) and/or locking block 80' may include a chamfered portion 80A' that may be disposed at a leading/front side of locking block 80'. Disposing chamfered portions 80A, 80A' at opposite sides of locking blocks 80, 80' may reduce and/or eliminate play between upper track 40 and lower track 30. In embodiments, the locking blocks 80, 80' may prevent a corresponding seat assembly 10 from traveling along the lower track 30 when the locking blocks 80, 80' are received by corresponding gaps 70 (e.g., in engaged/locking positions). The lower track 30 may include a plurality of gaps 70 disposed along a length of the lower track 30, which may permit the corresponding seat assembly 10 to be positioned at a plurality of locations along the length of the lower track 30. That is, in embodiments, a seat assembly 10 may be positioned at substantially any position along substantially the entire length of the lower track 30.

In embodiments, an upper track 40 may include one or more lower anchors $84_N$, such as generally illustrated in FIGS. 4 and 6. The lower anchors $84_N$ may be connected to and/or may extend from a lower portion of an interface member 42. For example, and without limitation, the upper track 40 may include four lower anchors 84$_N$ disposed along the lower portion of an interface member 42. It should be understood that while four lower anchors 84$_N$ are illustrated, embodiments may include zero, one, two, three, four, or more anchors. The lower anchors 84$_N$ may be configured to absorb force acting upon an upper track 40 in the vertical direction V. For example, if an upward vertical force is applied to upper track 40 while lower anchors 84$_N$ are not aligned with gaps 70, anchors may engage first track and/or restrict movement of upper track 40 in the vertical direction V (e.g., prevent removal of upper track 40 from lower track 30).

In embodiments, the lower anchors 84$_N$ may be configured to guide a corresponding upper track 40 along a lower track 30. For example, and without limitation, each lower anchor 84$_N$ may include one or more guiding portions 86. The guiding portions 86 may extend upward relative to the floor 16. The guiding portions 86 may be configured to cooperate with a portion of the inner profile 64 to limit movement of the upper track 40 in the y direction. In embodiments, such as generally illustrated in FIG. 6, the lower anchors 84$_N$ may be configured to pass through corresponding gaps 70. For example, and without limitation, an upper track 40 may be configured to be assembled with and/or disassembled from a lower track 30. In embodiments, one or more of the gaps 70 may be configured to receive a lower anchor 84 when an upper track 40 is assembled with the lower track 30. For example, and without limitation, the lower anchors 84$_N$ may be substantially simultaneously inserted into corresponding gaps 70 when the upper track 40 is assembled with the lower track 30.

In embodiments, the upper track 40 may be configured to be disassembled from the lower track 30. For example, and without limitation, when a seat assembly 10 is moving along a lower track 30, lower anchors 84$_N$ associated with a corresponding upper track 40 may be aligned with corresponding gaps 70. When the lower anchors 84$_N$ are aligned with the corresponding gaps 70, the seat assembly 10 and the corresponding upper track 40 may be lifted up and out of the lower track 30. That is, the lower anchors 84$_N$ may be lifted out of corresponding gaps 70. The lower track 30 may include a plurality of gaps 70, which may permit the upper track 40 to be removed from the lower track 30 in a plurality of positions along the lower track 30.

Figures 7A, 7B:
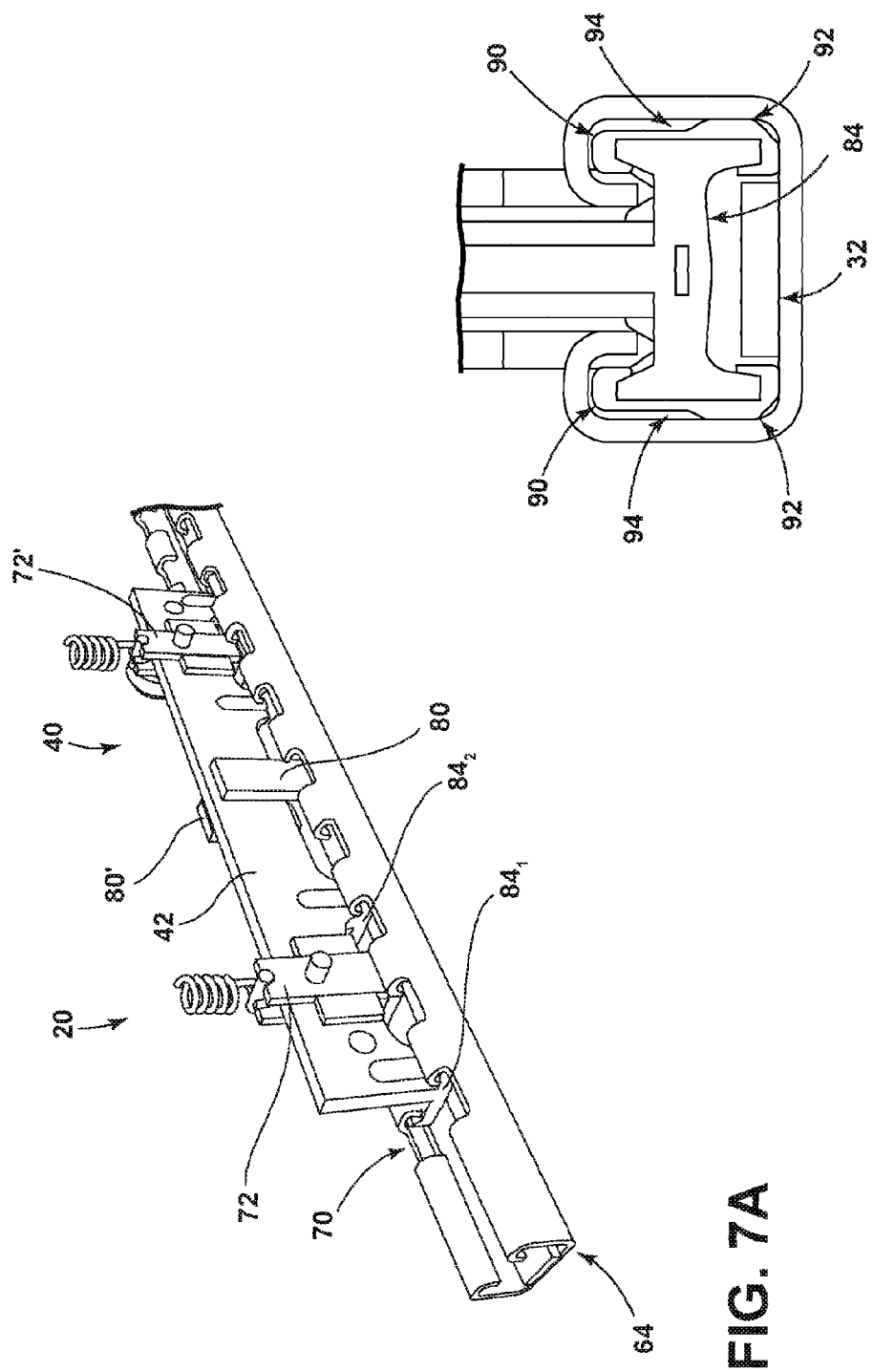
FIG. 7A is a perspective view generally illustrating a track assembly according to another embodiment of the present disclosure.
FIG. 7B is a front view generally illustrating the track assembly generally illustrated in FIG. 7A.

In embodiments, such as generally illustrated in FIG. 7A, a seat track assembly 20 may include one or more slide guides 90 that may be connected to upper track 40. The slide guides 90 may be configured for connection with and/or to receive at least a portion of a corresponding lower anchor 84$_N$. One or more of the slide guides 90 may include plastic material, such as, high-density polyethylene or polyvinyl chloride, for example. It should be understood that the slide guides 90 may comprise other suitable materials and/or plastics. In embodiments, one or more of the slide guides 90 may include at least one protrusion 92 disposed on an inner profile facing side 94. The protrusion 92 may be configured to make contact with a portion of the inner profile 64. As the upper track 40 travels along a corresponding lower track 30, at least one protrusion 92 may act to guide the upper track 40 and/or to limit movement of the upper track 40 in the longitudinal direction L. The slide guide 90 may be configured to make frictionless or substantially frictionless contact with the inner profile 64.

With reference to FIGS. 8A and 8B, in embodiments, a lower track 30 may comprise a single profile (e.g., as opposed to including inner and outer profiles 62, 64). In embodiments, the lower track 30 may include one or more sliding guides 96. For example, and without limitation, a sliding guide 96 may include a protrusion that may extend downward from an upper portion 44. The sliding guides 96 may be configured to guide the upper track 40 as the upper track 40 travels along a longitudinal direction L of the lower track 30. For example, and without limitation, the sliding guides 96 may be configured to engage and/or make contact with corresponding guiding portions 86 of corresponding anchors 84$_N$. The sliding guides 96 may limit movement of a corresponding lower anchor 84$_N$ in the transverse direction T when the sliding guides 96 engage one or more corresponding guiding portions 86.

Figure 10:
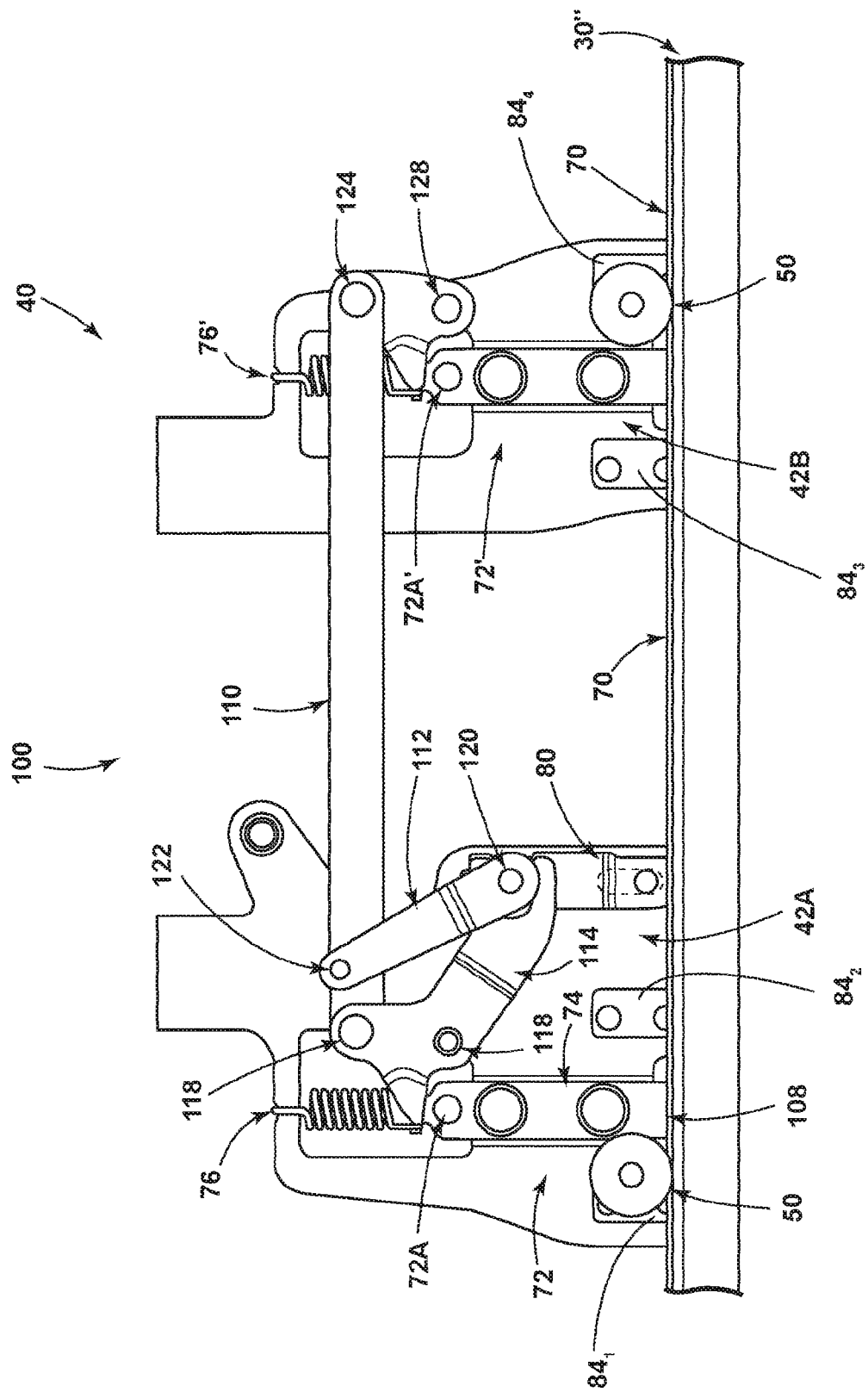
FIG. 10 is a side view generally illustrating the track assembly generally illustrated in FIG. 9.
Figure 11:
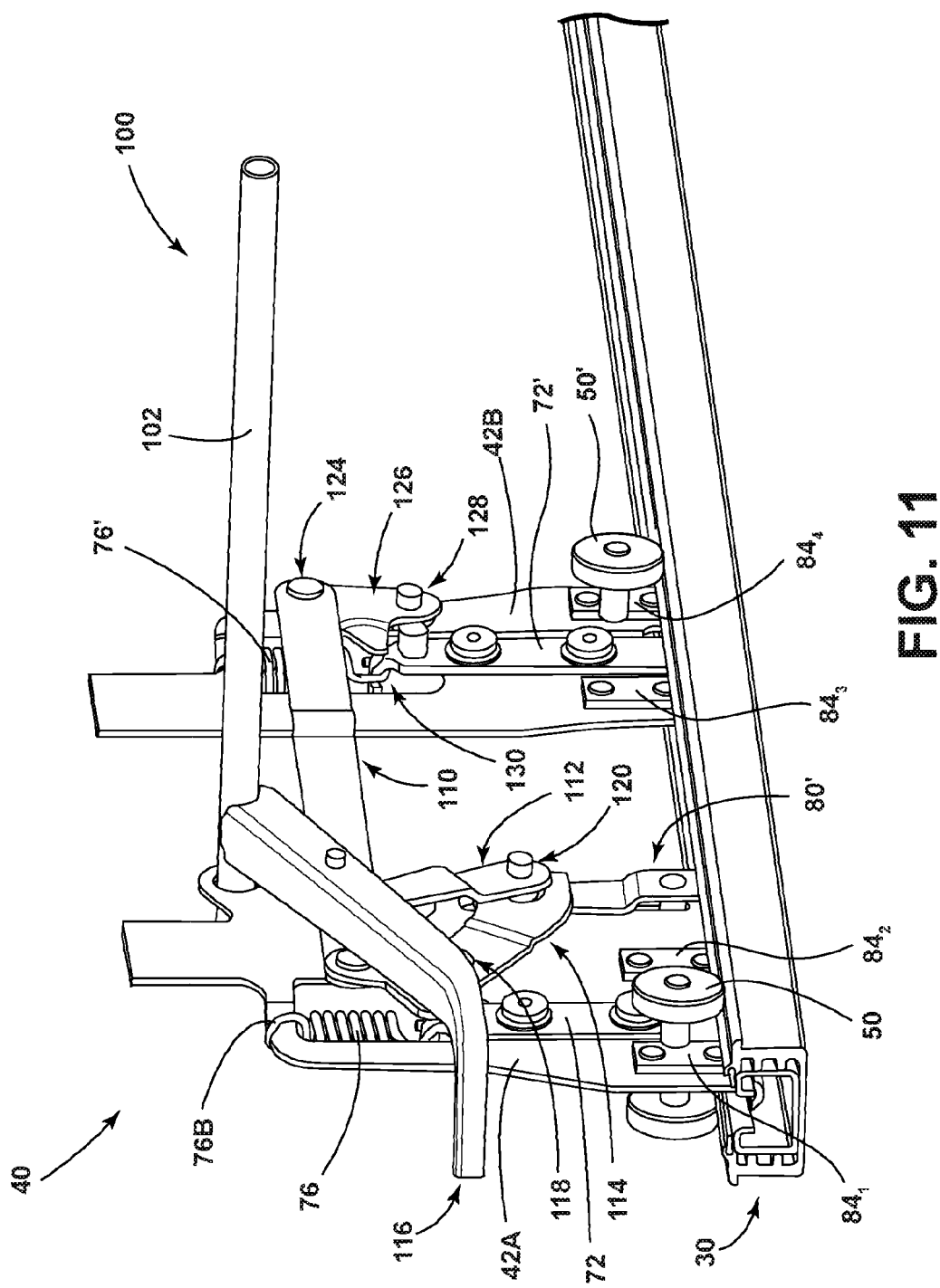
FIG. 11 is a perspective view generally illustrating the track assembly generally illustrated in FIG. 10.

In embodiments, such as generally illustrated in FIGS. 10 and 11, a seat track assembly 20 may include an actuator assembly 100 that may include a cross bar 102, a cross member 110, a first actuator lever 112, a second actuator lever 114, and/or an actuator 116 that may be configured to actuate one or more anchors 72 and/or one or more locking blocks 80. In embodiments, actuator 116 may include, for example, a lever and/or handle. Actuator 116 may be connected with first actuator lever 112 (e.g., via pin 122) such that actuation of actuator 116 (e.g., in an upward vertical direction, such as via a handle) may cause substantially upward movement of first actuator lever 112. First actuator lever 112 may be connected to locking block 80 (e.g., via pin 120) and upward movement of first actuator lever 112 may cause upward movement of locking block 80 such that locking block 80 disengages from lower track 30, which may permit longitudinal adjustment of upper track 40 relative to lower track 30. Additionally or alternatively, first actuator lever 112 may be connected to second actuator lever 114 (e.g., via an open connection with pin 120), and upward movement of first actuator lever 112 may cause rotation of second actuator lever 114 (e.g., about pin 118). Rotation of second actuator lever 114 may cause second actuator lever 114 to apply a substantially downward force on anchor 72, which may disengage anchor 72 from lower track 30 and may permit longitudinal adjustment of upper track 40 relative to lower track 30.

Figure 9:
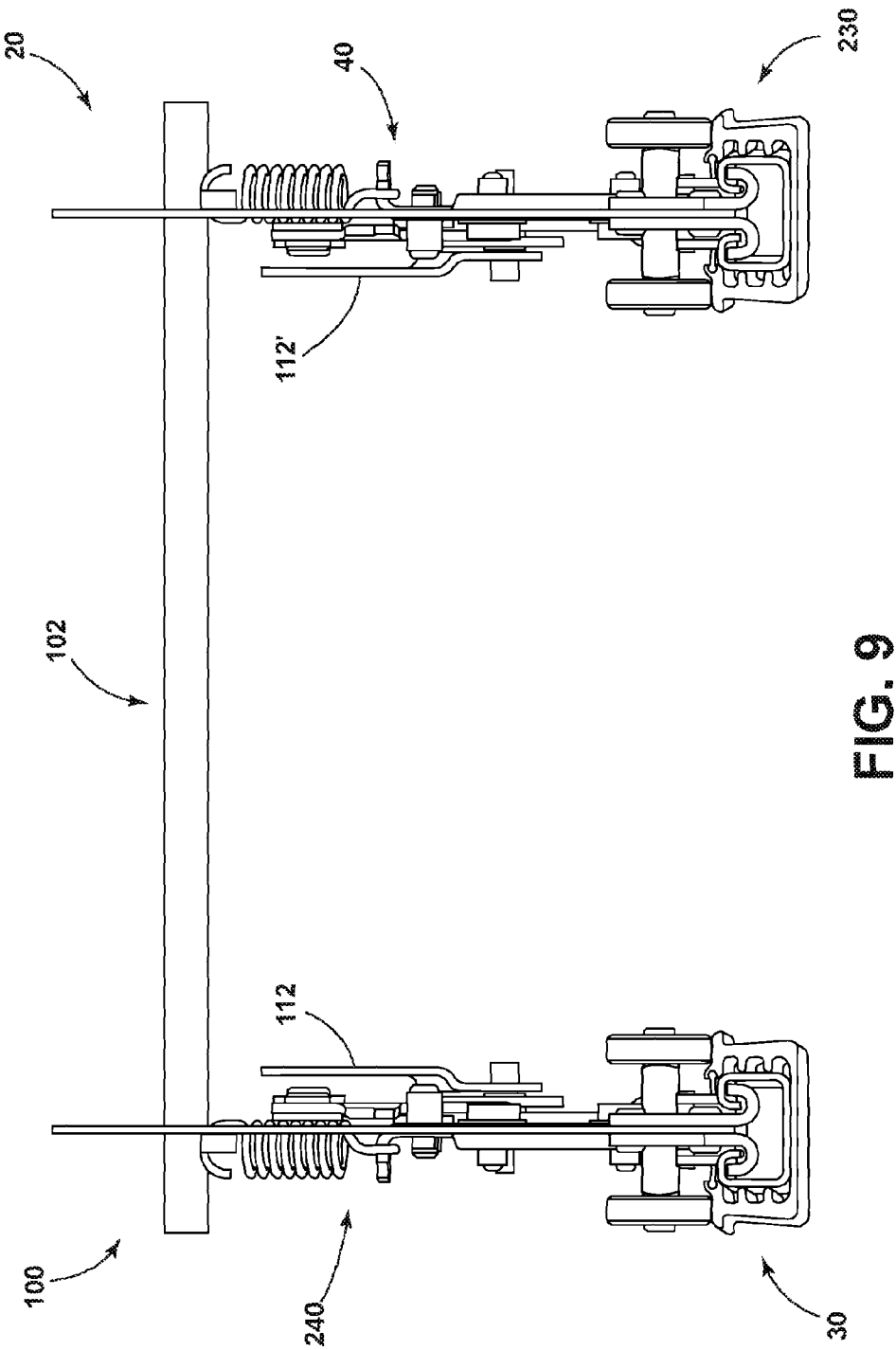
FIG. 9 is a front view generally illustrating a track assembly according to another embodiment of the present disclosure.
Figure 12A:
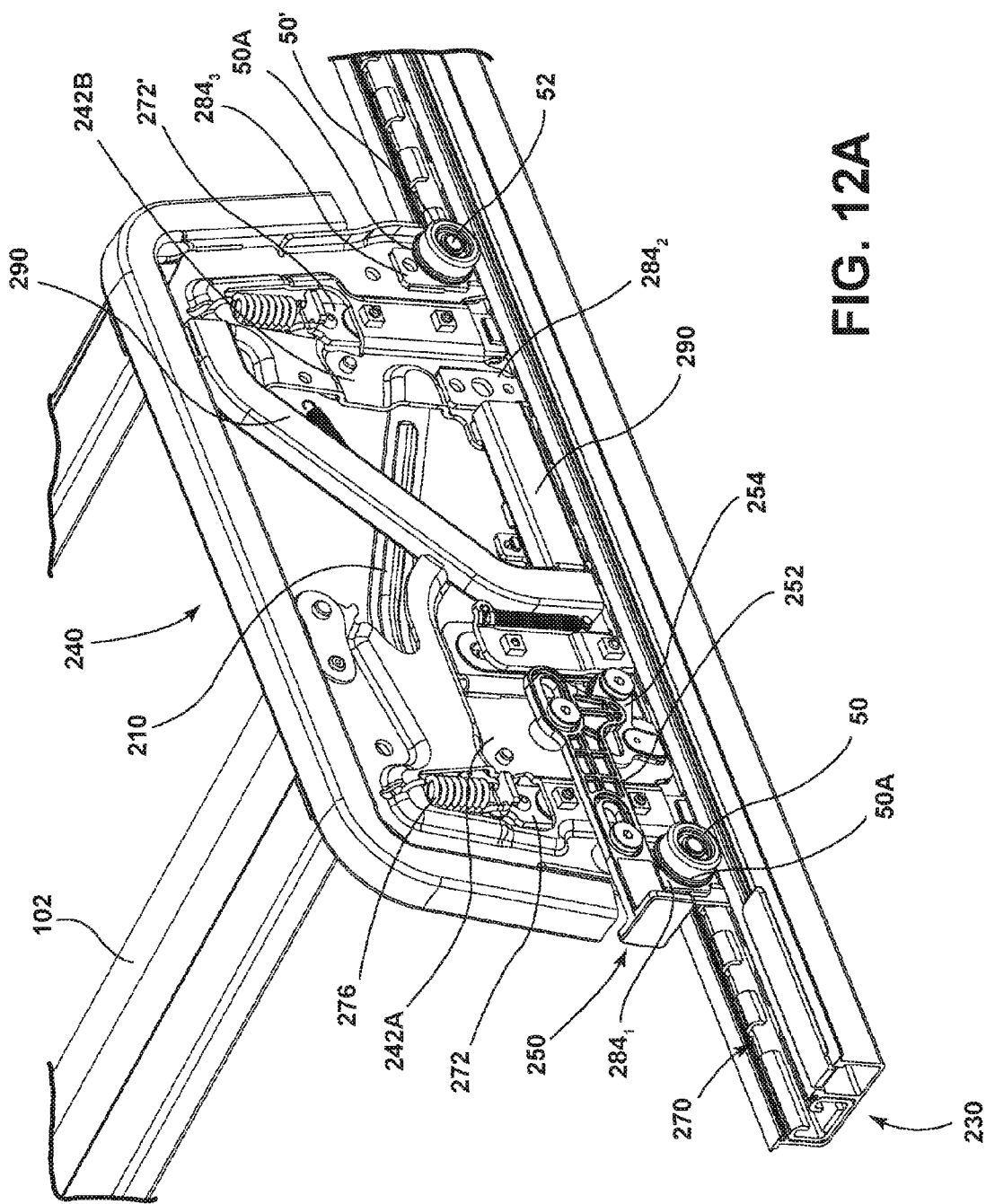
FIGS. 12A and 12B are perspective views generally illustrating track assemblies in accordance with embodiments of the present disclosure.
Figure 12B:
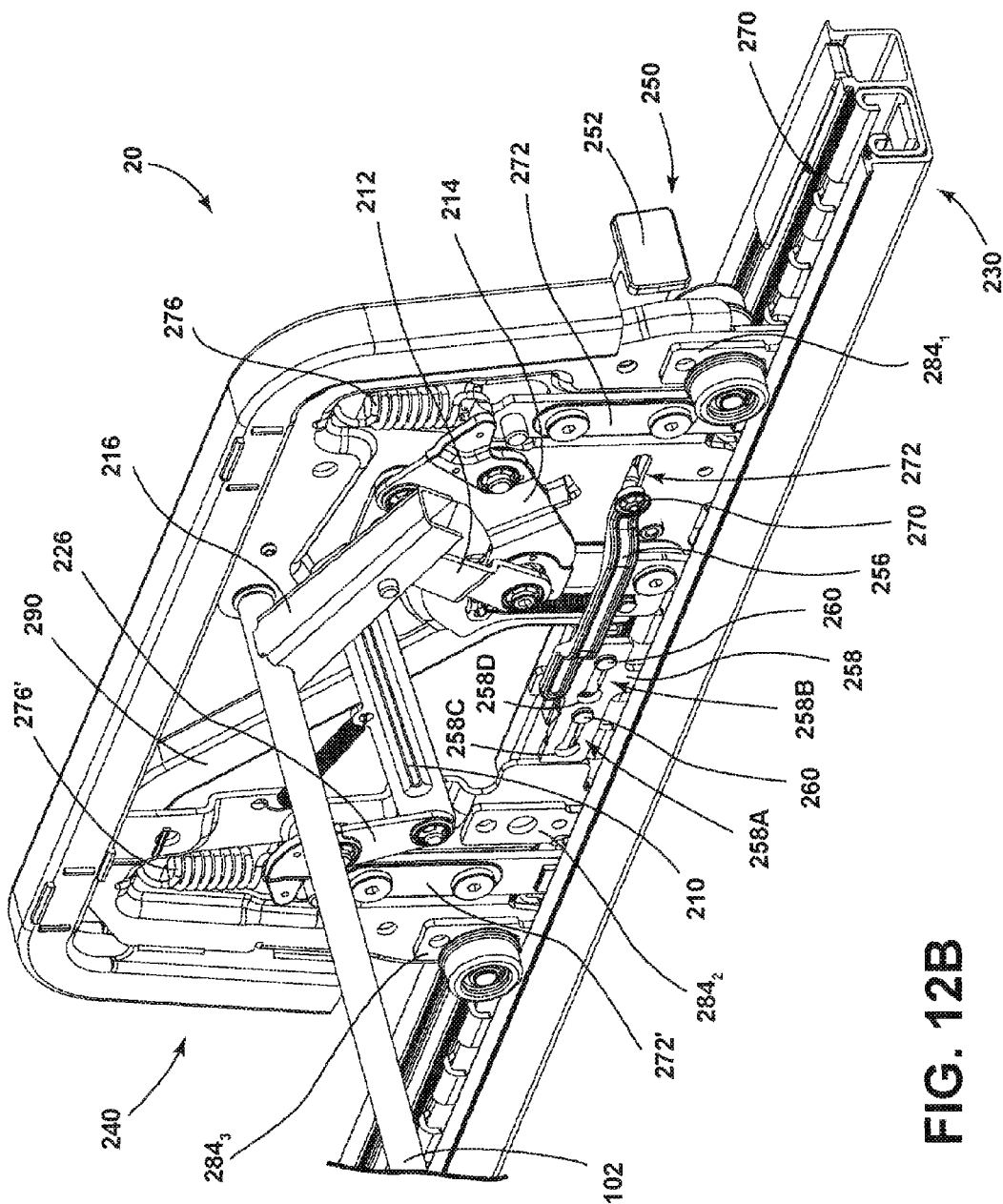

In embodiments, the cross bar 102 may be configured to couple and/or attach a first upper track 40 with a second upper track 240 that may be associated with a second lower track 230 (see, e.g., FIGS. 9 and 12A-12B). Second lower track 230 and/or second upper track 240 may be configured in similar and/or substantially the same manners as lower track 30 and upper track 40, respectively. For example, and without limitation, actuation of actuator 116 may cause actuation of first upper track 40 and second upper track 240 (e.g., actuation of anchors 72, 72', 272, 272' and a locking blocks 80, 280 of first upper track 40 and second upper track 240). Rotation of actuator 116 may cause rotation of cross bar 102, which may cause rotation of a second actuator 216, which may cause substantially vertical movement of a first actuator lever 212, which may be connected to an interface member 242 of second upper track 240. Movement of first actuator lever 212 may cause movement of a locking block 280, which may disengage locking block 80 from second lower track 230. Movement of first actuator lever 212 may cause rotation of second actuator lever 214, which may apply a downward force on anchor 272 and may disengage anchor 272 from second lower track 230. Rotation of second actuator lever 214 may, additionally or alternatively, cause movement of a cross member 210, which may cause rotation of an anchor actuator 226. Rotation of anchor actuator 226 may apply a downward force on second anchor 272', which may disengage second anchor 272' from second lower track 230. Upper tracks 40, 240 may move substantially freely relative to lower tracks 30, 230 if locking blocks 80, 280 are disengaged from lower tracks 30, 230 (e.g., moved vertically upward and out of gaps 70, 270) and anchors 72, 72', 272, 272' are disengaged from lower tracks 30, 230 (e.g., moved vertically downward).

In embodiments, such as generally illustrated in FIGS. 10, 11, 12A, and 12B, interface members 42, 242 may include first portion 42A, 242A and/or second portions 42B, 242B that may be separate from each other and/or that may be connected via a cross member 110, 210 and/or via one or more connecting members 290. A first set of wheels 50, a first anchor 72, 272, and/or a locking block 80, 280 may be connected to the first portions 42A, 242A. A second set of wheels 50' and/or a second anchor 72', 272' may be connected to the second portion 42B, 242B. The anchors 72, 72', 272, 272' may be attached and/or connected to the first portion 42A, 242A and the second portion 42B, 242B in a similar fashion as described above. In embodiments, an upper portion of a springs 76, 276 may be attached and/or connected to the first portions 42A, 242A and other springs 76', 276' may be attached and/or connected to the second portions 42B, 242B. Cross member 110 may be configured to actuate second anchor 72'. For example, and without limitation, cross member 110 may be connected to an anchor actuator 126 via a pin 124 and anchor actuator 126 may be configured to rotate about a pin 128. Upon rotation, anchor actuator 126 may contact an anchor contact portion 72A' (e.g., a substantially horizontal protrusion) of anchor 72' and may apply a downward force to anchor 72', which may disengage anchor 72' from lower track 30.

In embodiments in which interface members 42, 242 include four lower anchors (see, e.g., FIGS. 10 and 11), a first set of lower anchors (e.g., lower anchors $84_1$, $84_2$) may be connected to a first portion (e.g., first portion 42A) and a second set of lower anchors (e.g., lower anchors $84_3$, $84_4$) may be connected to a second portion (e.g., second portion 42B). In embodiments in which interface members 42, 242 include three lower anchors (see, e.g., FIGS. 12A and 12B), a first anchor (e.g., lower anchor $284_1$) may be connected to a first portion (e.g., first portion 242A) and a pair of lower anchors (e.g., lower anchors $284_2$, $284_3$) may be connected to a second portion (e.g., second portion 242B). Some or all of lower anchors $84_N$, $284_N$ may be fixed to respective portions of interface members 42, 242 and/or may not move relative to interface members 42, 242.

In embodiments, the springs 76, 76', 276, 276' may be configured to limit movement of the upper tracks 40, 240 in the vertical direction V. For example, and without limitation, the springs 76, 76', 276, 276' may bias corresponding anchors 72, 72', 272, 272', such that, when the upper tracks 40, 240 are at rest and/or stationary (e.g., when a corresponding seat assembly 10 is not being moved), the springs 76, 76', 276, 276' may be configured to bias corresponding anchors 72, 72', 272, 272', upward—i.e., toward the upper track 40, 240. Biasing anchors 72, 72', 272, 272' upward may bias upper tracks 40, 240 into contact with lower tracks 30, 230, which may limit noise generated between lower tracks 30, 230 and upper tracks 40, 240 (e.g., may reduce and/or eliminate rattle noises).

In embodiments, upper tracks 40, 240 may be removed from lower tracks 30, 230 in at least some positions. For example, and without limitation, if upper tracks 40, 240 are moved to a position in which anchors 72, 72', 272, 272' are aligned with gaps 70, 270 and lower anchors $84_N$, $284_N$ are aligned with gaps 70, 270, upper tracks 40, 240 may be removed (e.g., vertically) from lower tracks. Removing upper tracks 40, 240 from lower tracks 30, 230 may, for example, and without limitation, permit the removal of a seat (which may be connected to upper tracks 40, 240) from a vehicle.

In embodiments, such as generally illustrated in FIGS. 12A and 12B, track assembly 20 may include a release alignment mechanism 250. Release alignment mechanism 250 may be configured to facilitate removal of upper tracks 40, 240 from lower tracks 30, 230. Release alignment mechanism 250 may include a first lever 252, a second lever 254, a third lever 256, and/or a fourth lever 258. The first lever 252 may be configured for actuation, such as by a user. Actuation of first lever 252 may cause rotation of second lever 254. Second lever 254 may be configured to selectively engage gaps 70, 270 of a lower track 30, 230. For example, and without limitation, in a first position of second lever (e.g., as shown in FIGS. 12A and 12B), second lever 254 may not engage a lower track 30, 230, and, in a second position, second lever may engage the lower track 30, 230, which may restrict longitudinal movement of upper tracks 40, 240. Restricting movement of seat may correspond to aligning anchors 72, 72', 272, 272' and/or lower anchors $84_N$, $284_N$ with gaps 70, 270 in lower tracks 30, 230 such that upper tracks 40, 240 (and a seat that may be connected thereto) may be removed (e.g., move vertically out of track). Release alignment mechanism 250 may be actuated while upper tracks 40, 240 are moving. If, upon initial actuation, second lever 254 is not aligned with a gap 70, 270, longitudinal movement of upper tracks 40, 240 may continue until second lever 254 is aligned with a gap 70, 270, at which point second lever may continue to rotate into the gap 70, 270 and prevent further longitudinal movement of upper tracks 40, 240. In positions in which second lever engages a gap 70, 270, locking blocks 80, 80', 280, 280' may not be aligned with gaps 70, 270 and/or may not be engaged with a lower track 30, 230.

With embodiments, third lever 256 may be connected to first lever 252 such that actuation of first lever 252 (e.g., linear movement of first lever 252 in a forward longitudinal direction) may cause forward linear movement of third lever 256. For example, and without limitation, first lever 252 may be connected to third lever 256 via a pin that may slide within a slot of first portion 242A. Fourth lever 258 may be connected to third lever 256 such that forward linear movement of third lever 256 may cause forward linear movement of fourth lever 258. Fourth lever 258 may be configured such that it has at least two positions. In a first, unactuated position, fourth lever 258 may not engage a gap 70, 270 of lower track. In a second, actuated position, fourth lever 258 may engage at least one gap 70, 270. For example, and without limitation, fourth lever 258 may be connected to first portion 242A, second portion 242B, and/or a connecting member 290 via one or more protrusions that may extend substantially in the transverse direction T. Fourth lever 258 may include a corresponding slot for each pin (e.g., slots 258A, 258B). As fourth lever 258 moves (e.g., upon actuation via first lever 252 and third lever 256), pins 260 may slide in slots 258A, 258B until enlarged areas 258C, 258D of slots 258A, 258B are reached. If fourth lever 258 is moved such that pins 260 are aligned with and/or disposed in enlarged areas 258C, 258D, fourth lever 258 may be permitted to move vertically downward to engage one, or more gaps 70, 270.

In embodiments, a method of operating a track assembly 20 may include providing the track assembly. The track assembly may include a first track 30 and/or a second track 40 that may be movably connected to the first track 30. The second track 40 may comprise an interface member 42. A plurality of wheels 50 may be connected to the seat interface member. An anchor 72 may be movably connected to the interface member 42 and may be configured to selectively engage the first track 30. A locking block 80 may be movably connected to the interface member 42 and may be configured to selectively engage the first track 30. The method may include disengaging the locking block 80 from the first track 30. The method may include disengaging the anchor 72 from the first track 30. The method may include moving the second track 40 relative to the first track 30 from a first position to a second position. The method may include removing the second track from the first track at the second position. The method may include actuating a release alignment mechanism 250. The release alignment mechanism 250 may include a first lever 252 and a second lever 254. The second lever 254 may be configured to selectively engage the first track. The method may include reassembling the second track 40 with the first track 30 at a third position, moving the second track 40 to a fourth position, engaging the locking block 80, and/or engaging the anchor 72. The method may include moving the second track 40 from the fourth position to a fifth position, and removing the second track from the first track at the fifth position. One or more of the first position, the second position, the third position, the fourth position, and the fifth position may be different from each other. For example, and without limitation, all of the first through fifth positions may be different from each other, and second track 40 may be removable from and configured for reassembly with first track 30 in at least the second position, the third position, and the fourth position (e.g., at least three different relative positions between the first track 30 and the second track 40).

Lower anchors $84_N$, $284_N$ may be configured for absorbing downward vertical forces. For example, and without limitation, cargo may be stored on seat assembly 10 and the weight of the cargo may exert a downward force on the seat assembly 10 and the downward force may be transferred to a corresponding upper track 40. If the downward force is sufficiently large, one or more of the lower anchors $84_N$, $284_N$ may be configured to make contact with a bottom surface of inner profile to distribute at least a portion of the downward force into floor 16, which may relieve at least a portion of the downward force from the upper track 40.

In embodiments, in the event of one or more large forces being applied to seat track assembly 20 (e.g., in a vehicle crash), the forces may be distributed, evenly or unevenly, between one or more lower anchors $84_N$, $284_N$, one or more spring biased anchors 72, and one or more locking blocks 80.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, and/or physical connections. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A track assembly, comprising:
   a first track; and,
   a second track movably connected to the first track, the second track comprising:
      an interface member including a first end and a second end;
      a plurality of wheels connected to the interface member;
      an anchor movably connected to the interface member and configured to selectively engage the first track;
      a second anchor movably connected to the interface member and configured to selectively engage the first track; and
      a locking block movably connected to the interface member and configured to selectively engage the first track.

2. The track assembly of claim 1, wherein the anchor is configured to restrict movement of the second track relative to the first track in a first direction.

3. The track assembly of claim 2, wherein the locking block is configured to restrict movement of the second track relative to the first track in a second direction.

4. The track assembly of claim 3, wherein the first direction is a vertical direction and the second direction is a longitudinal direction.

5. The track assembly of claim 1, comprising a spring connected to the anchor and configured to bias the anchor into engagement with the first track.

6. The track assembly of claim 1, wherein the plurality of wheels includes four wheels configured to roll in a longitudinal direction on a rolling surface of the first track.

7. The track assembly of claim 1, wherein the first track includes a plurality of gaps and the locking block is configured to engage one or more of the plurality of gaps.

8. A track assembly, comprising:
a first track; and,
a second track movably connected to the first track, the second track comprising:
an interface member including a first end and a second end;
a plurality of wheels connected to the interface member;
an anchor movably connected to the interface member and configured to selectively engage the first track;
a locking block movably connected to the interface member and configured to selectively engage the first track; and
a second locking block.

9. The track assembly of claim 8, further comprising a second anchor, the second anchor movably connected to the interface member and configured to selectively engage the first track.

10. The track assembly of claim 8, wherein the locking block and the second locking block are disposed at opposite sides of the interface member.

11. The track assembly of claim 8, wherein the locking block includes a chamfered leading edge and the second locking block includes a chamfered trailing edge.

12. The track assembly of claim 10, wherein the locking block and the second locking block are configured to move independently from each other.

13. The track assembly of claim 1, wherein the first track includes an inner profile and an outer profile.

14. The track assembly of claim 13, wherein the inner profile comprises steel and the outer profile comprises aluminum.

15. The track assembly of claim 1, comprising a release alignment mechanism connected to the second track, the release alignment mechanism including a first lever and a second lever, the second lever configured to selectively engage the first track upon actuation of the first lever.

16. A method of operating a track assembly, the method comprising:
providing the track assembly, the track assembly comprising:
a first track; and
a second track movably connected to the first track, the second track comprising:
an interface member including a first end and a second end;
a plurality of wheels connected to the interface member;
an anchor movably connected to the interface member and configured to selectively engage the first track; and
a locking block movably connected to the interface member and configured to selectively engage the first track;
actuating a release alignment mechanism, the release alignment mechanism including a first lever and a second lever, the second lever configured to selectively engage the first track;
disengaging the locking block from the first track;
disengaging the anchor from the first track;
moving the second track relative to the first track from a first position to a second position; and,
removing the second track from the first track.

17. The method of claim 16, wherein the track assembly includes a second anchor movably connected to the interface member and configured to selectively engage the first track; and the track assembly includes a second locking block.

18. The method of claim 16, further comprising reassembling the second track with the first track at a third position, moving the second track to a fourth position, engaging the locking block, and engaging the anchor.

19. The method of claim 18, further comprising moving the second track from the fourth position to a fifth position, and removing the second track from the first track.

20. The method of claim 19, wherein at least the second position and the third position are different.

* * * * *